(12) United States Patent
Demirhan et al.

(10) Patent No.: US 8,149,746 B2
(45) Date of Patent: Apr. 3, 2012

(54) BATTERY LEVEL BASED CONFIGURATION OF A MOBILE STATION BY A BASE STATION

(75) Inventors: Mustafa Demirhan, Hillsboro, OR (US); Ali Taha Koc, Hillsboro, OR (US); Shweta Shrivastava, Beaverton, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 855 days.

(21) Appl. No.: 11/467,881

(22) Filed: Aug. 28, 2006

(65) Prior Publication Data

US 2008/0049653 A1 Feb. 28, 2008

(51) Int. Cl.
*H04W 4/00* (2009.01)
*H04B 7/216* (2006.01)
*H04J 3/14* (2006.01)
*H04M 1/00* (2006.01)

(52) U.S. Cl. ........ 370/311; 370/335; 370/230; 455/574; 455/572

(58) Field of Classification Search ............ 455/515, 455/574, 572, 343, 423, 13.4, 522; 375/150; 370/335, 311, 318, 334, 339, 348, 259, 328; 340/825, 7.37

See application file for complete search history.

(56) References Cited

U.S. PATENT DOCUMENTS

| | | | | |
|---|---|---|---|---|
| 4,839,639 A * | 6/1989 | Sato et al. | ............ | 340/7.34 |
| 6,072,784 A * | 6/2000 | Agrawal et al. | ............ | 370/311 |
| 6,160,490 A * | 12/2000 | Pace et al. | ............ | 340/7.37 |
| 6,275,712 B1 * | 8/2001 | Gray et al. | ............ | 455/522 |
| 6,445,917 B1 * | 9/2002 | Bark et al. | ............ | 455/423 |
| 6,519,277 B2 * | 2/2003 | Eidson | ............ | 375/150 |
| 7,236,740 B2 * | 6/2007 | Koo et al. | ............ | 455/13.4 |
| 7,477,628 B2 * | 1/2009 | Hagiwara et al. | ............ | 370/335 |
| 7,697,469 B2 * | 4/2010 | Wu et al. | ............ | 370/328 |
| 2002/0128051 A1 * | 9/2002 | Liebenow | ............ | 455/574 |
| 2003/0060244 A1 * | 3/2003 | Ruohonen | ............ | 455/574 |
| 2004/0180701 A1 * | 9/2004 | Livet et al. | ............ | 455/574 |
| 2008/0031160 A1 * | 2/2008 | Ryu et al. | ............ | 370/259 |

* cited by examiner

*Primary Examiner* — Lester Kincaid
*Assistant Examiner* — Kuo Woo
(74) *Attorney, Agent, or Firm* — Schwabe, Williamson & Wyatt, P.C.

(57) ABSTRACT

Embodiments of the present invention provide methods and systems for battery level based configuration of a mobile station by a base station. Other embodiments may be described and claimed.

23 Claims, 4 Drawing Sheets

BATTERY LEVEL BASED CONFIGURATION OF A MOBILE STATION BY A BASE STATION

TECHNICAL FIELD

Embodiments of the present invention relate to the field of wireless communication networks, and more particularly, to methods and systems for battery level based configuration of a mobile station by a base station.

BACKGROUND

Within wireless communication networks, minimizing power consumption at a mobile station is an important factor in the design of wireless communication networks and mobile equipment for use as mobile stations within the network in order to provide longer battery life. One important method for minimizing power consumption is to use an idle mode of operation when there is no activity in a mobile station. The mobile station periodically exits the idle mode in order to determine if it has been paged, i.e., some entity is attempting to communicate with it. If the mobile station has been paged, then it "awakens," otherwise it returns to the idle mode in order to continue to conserve battery power. However, once the mobile station is fully awake, power consumption from the battery may be high.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)". For the purposes of the present invention, the phrase "at least one of A, B, and C" means "(A), (B), (C), (A and B), (A and C), (B and C), or (A, B and C)". For the purposes of the present invention, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention provide methods and systems for battery level based configuration of a mobile station by a base station.

Figure 1:
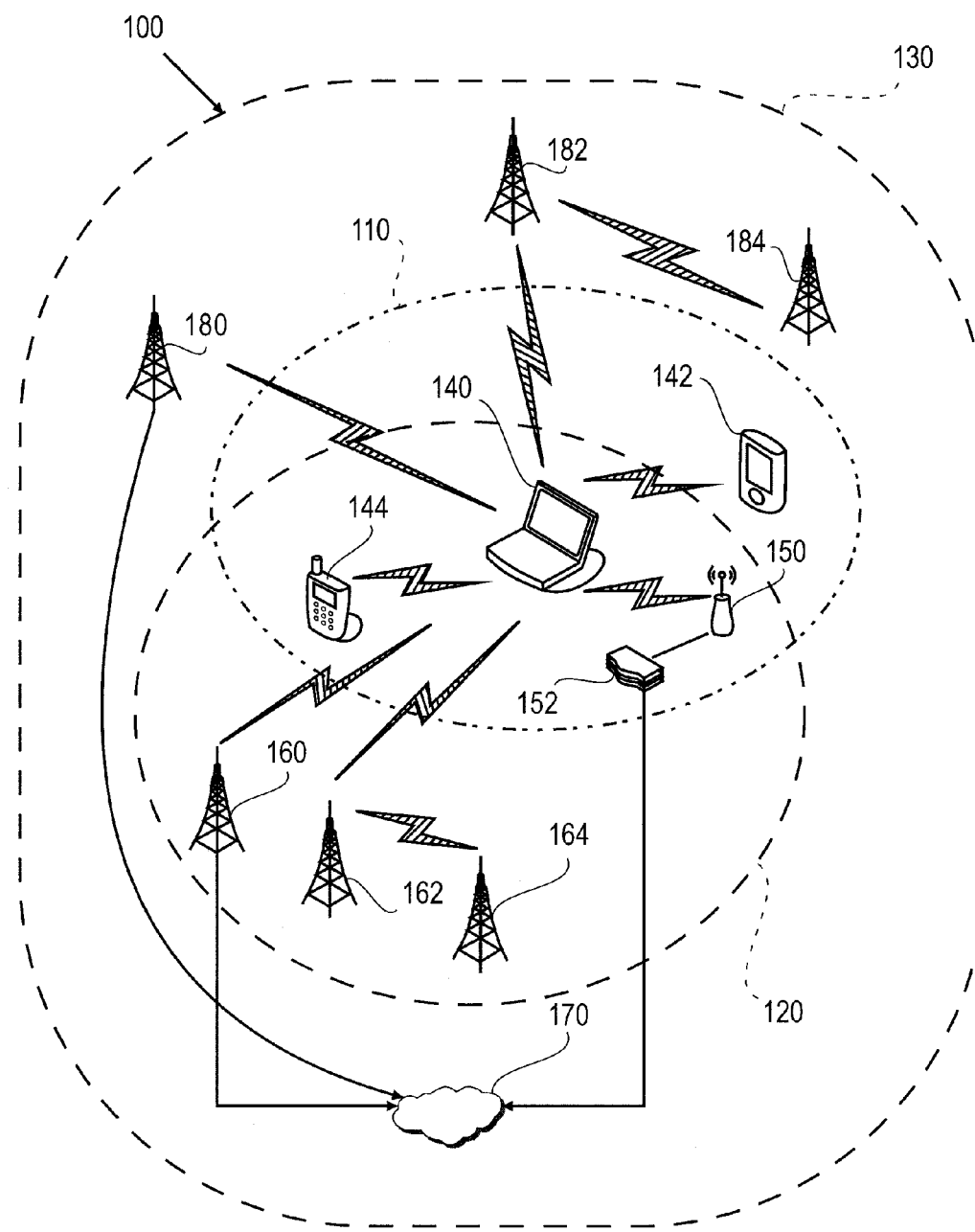
FIG. 1 is a schematic diagram representation of an example wireless communication system in accordance with various embodiments of the present invention.

Referring to FIG. 1, an example wireless communication system 100 may include one or more wireless communication networks, generally shown as 110, 120 and 130. In particular, the wireless communication system 100 may include a wireless local area network (WLAN) 110, a wireless metropolitan area network (WMAN) 120 and a wireless wide area network (WWAN) 130. Although FIG. 1 depicts three wireless communication networks, the wireless communication system 100 may include additional or fewer wireless communication networks. For example, the wireless communication network 100 may include more or less WLANs, WMANs and/or WWANs. The methods and apparatus described herein are not limited in this regard.

The wireless communication system 100 may also include one or more mobile stations, also referred to as subscriber stations, generally shown as 140, 142 and 144. For example, the subscriber stations 140, 142 and 144 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a global positioning satellite (GPS) device), a wireless peripheral (e.g., a printer, a scanner, a headset, a keyboard, a mouse, etc.), a medical device (e.g., a heart rate monitor, a blood pressure monitor, etc.), an d/or other suitable fixed, portable, or mobile electronic devices. Although FIG. 1 depicts three subscriber stations, the wireless communication system 100 may include more or less subscriber stations.

The subscriber stations 140, 142 and 144 may use a variety of access schemes such as, for example, orthogonal frequency-division multiple access (OFDMA), spread spectrum schemes (e.g., direct sequence code division multiple access (DS-CDMA) and/or frequency hopping code division multiple access (FH-CDMA)), time-division multiple access (TDMA), frequency-division multiplexing access (FDMA) and/or other suitable access schemes to communicate via wireless links.

In one example, the subscriber stations may use a direct sequence spread spectrum (DSSS) scheme and/or frequency hopping spread spectrum (FHSS) scheme to implement the WLAN 110 (e.g., modulations in accordance with any one of the 802.11 family of standards developed by the Institute of Electrical and Electronic Engineers (IEEE) and/or variations and evolutions of these standards). For example, the laptop computer 140 may communicate with devices associated with the WLAN 110 such as the handheld computer 142 and/or the smart phone 144 via wireless links. The laptop computer 140 may also communicate with an access point (AP) 150 via a wireless link. Generally, WLANs and WMANs include multiple APs 150. The AP 150 may be operatively coupled to a router 152 as described in further detail below. Alternatively, the AP 150 and the router 152 may be integrated into a single device (e.g., a wireless router).

The subscriber stations may use OFDMA to transmit large amounts of digital data by splitting a radio frequency signal into multiple small sub-signals, which in turn, are transmitted simultaneously at different frequencies. In particular, the subscriber stations may use OFDMA to implement the WMAN 120. For example, the subscriber stations may operate in accordance with the 802.16 family of standards developed by IEEE to provide for fixed, portable, and/or mobile broadband wireless access (BWA) networks (e.g., the IEEE std. 802.16, published by IEEE 2004) to communicate with base stations, generally shown as 160, 162, and 164, via wireless link(s).

Although some of the above examples are described with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP, 3GPP2), etc.). For example, long term evolution (LTE, a 3GPP standard), air interface evolution (a 3GPP2 standard) are suitable standards for applicability with regard to various embodiments of the present invention in addition to IEEE 802.16 and WiMAX standards. The methods and apparatus described herein are not limited in this regard. Additionally, the subscriber stations may operate in accordance with other wireless communication protocols to support the WWAN 130. In particular, these wireless communication protocols may be based on analog, digital, and/or dual-mode communication system technologies such as, for example, Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, standards based on these technologies, variations and evolutions of these standards, and/or other suitable wireless communication standards.

The WLAN 110, WMAN 120 and WWAN 130 may be operatively coupled to a common public or private network 170 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 110 may be operatively coupled to the common public or private network 170 via an AP 150 and/or the router 152. In another example, the WMAN 120 may be operatively coupled to the common public or private network 170 via the base station(s) 160, 162, and/or 164. In another example, the WWAN 130 may be operatively coupled to the common public or private network 170 via base station(s) 180, 182 and/or 184.

The wireless communication system 100 may include other WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

Figure 2:
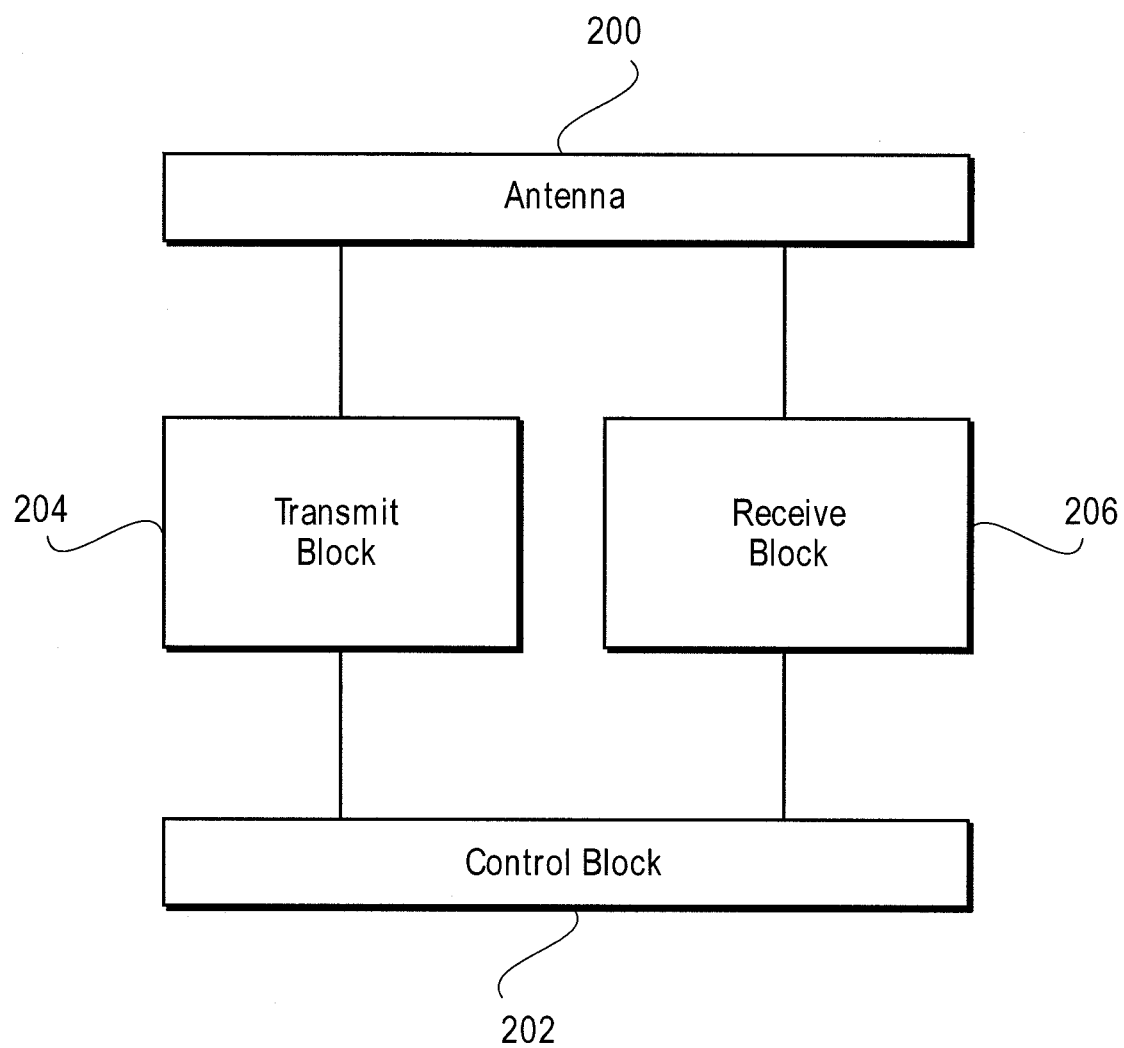
FIG. 2 is a block diagram representation of an example mobile station and base station, in accordance with various embodiments of the present invention.

In accordance with various embodiments of the present invention, as may be seen schematically in FIG. 2, a base station and mobile station each comprise an omnidirectional antenna 200, a control block 202, a transmit block 204 operatively coupled to the control block and antenna, and a receive block 206 operatively coupled to the control block and antenna. In accordance with various embodiments, a different type of antenna may be used. At least the transmit block and receive block may be part of a transceiver having at least one common component. Within at least the mobile station, the transmit and receive blocks comprise components implementing a medium access control (MAC) layer and a Physical (PHY) layer of a communication model. As is known in the art, the mobile station may enter and exit a paging mode by the control block powering at least some or all of the components implementing the MAC and/or PHY layers off and on. The mobile station generally associates (makes first contact) with a base station of a network upon entering the network's coverage area. In accordance with various embodiments, the wireless network generally has paging groups comprising one or more base stations, often defined by location within the network. In accordance with various embodiments, the mobile station is assigned to a paging group upon association with the base station.

In accordance with various embodiments of the present invention, a battery level within a mobile station is monitored by a component of the mobile station. The mobile station provides feedback relating to its battery level to a base station within the wireless network with which it is communicatively associated.

In accordance with various embodiments, battery level feedback may be provided at different times. For example, the feedback may be provided periodically. Thus, the mobile station may periodically send its current battery power level information to the base station using, for example, MAC management messages. Such periodicity may be configurable by the base station or through negotiation between the mobile station and base station. The periodic feedback may, for example, occur after a predetermined amount of time, at set time intervals, or at differing time intervals.

Figure 3:
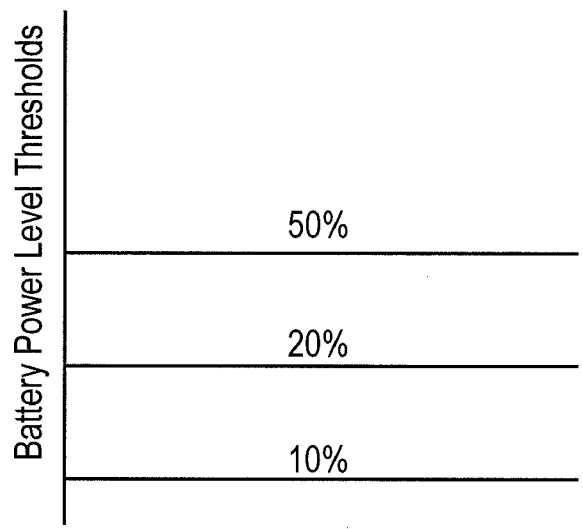
FIG. 3 is a schematic illustration of a battery level thresholds, in accordance with various embodiments of the present invention.

In accordance with various embodiments of the present invention, the battery level feedback may be event driven. Thus, the mobile station may send feedback relating to its current battery power level when the mobile station's power level crosses (falls below) a predetermined threshold. With reference to FIG. 3, it may be seen that there may be multiple power threshold levels. For example, as may be seen in FIG. 3, the mobile station may send feedback to the base station when its battery power level crosses 50% available, may send further feedback when the battery power level crosses 20% available, and may send a final feedback message when its battery power level crosses 10% available. These thresholds may be set by the base station upon network entry and association of the mobile station with the base station. Alternatively, the mobile station may set its own thresholds. In accordance with various embodiments, the thresholds may change based upon load of the network. For example, if the network is heavily loaded, then the base station may wish to know when the battery power level for the mobile station passes the 50%, 20% and 10% thresholds, while if the network is not so heavily loaded, then the base station may desire the battery power level feedback when the mobile station passes the 40%, 10% and 5% thresholds. The reasons for the differing threshold levels based upon the network's load will become more apparent herein.

Figure 4:
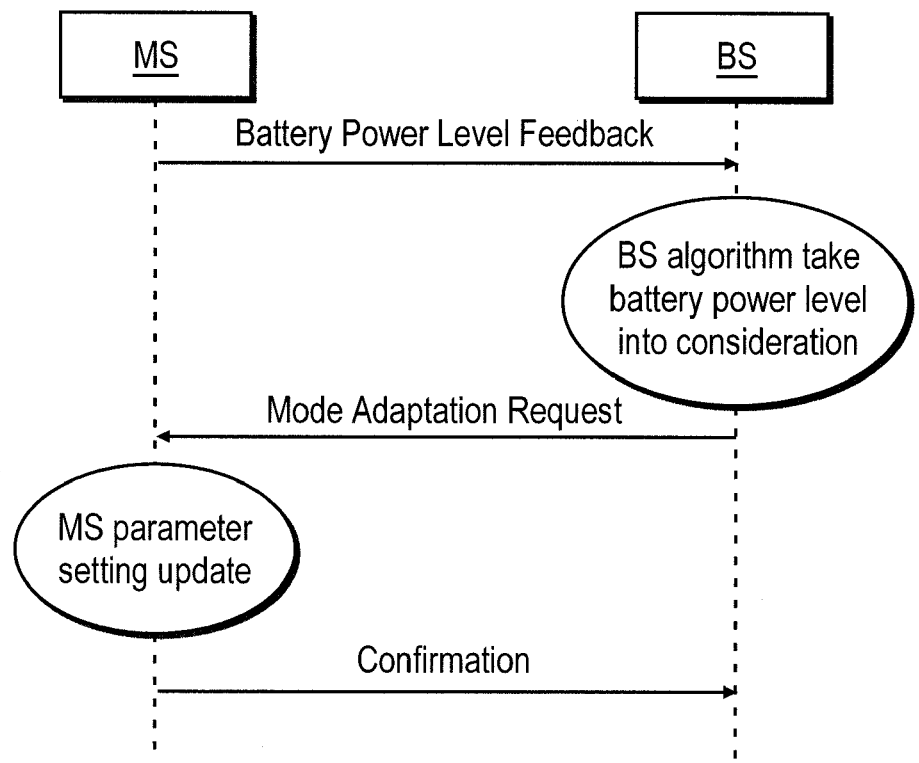
FIG. 4 is a schematic illustration of battery level feedback and operation parameter configuration messaging, in accordance with various embodiments of the present invention.

In accordance with various embodiments of the present invention, the base station that receives the battery power level feedback from the mobile station may use the feedback information to adapt connected mode operations with respect to the mobile station in order to extend the battery life of the mobile station. As may be seen in FIG. 4, the mobile station provides the battery power level feedback to the base station with which it is associated. In alternate embodiments, the feedback may be provided to an access point, which forwards the feedback to the base station. Various base station (BS) algorithms may utilize the battery power level as input in order to configure one or more operation parameters for the mobile station and/or the network. The mobile station, in accordance with various embodiments, is provided with the operation parameter configurations via a "mode adaptation request" message, once again either directly from the base station or via an access point. The base station also updates the related operation parameter configurations within its base station functions. Once the mobile station receives the "mode adaptation request" message, it updates its operation parameters accordingly. In accordance with various embodiments, the mobile station may send a confirmation message to the base station.

In accordance with various embodiments of the present invention, the mobile station may make the decision with respect to one or more operation parameter configuration changes based upon its battery level and may thus, notify and/or request the base station for the change(s).

Examples of operation parameter configurations that may utilize battery power level feedback from the mobile stations include, but are not limited to, receiver and transmitter schemes, antenna schemes, error control schemes, overhead information within message packets, paging group configuration, paging group cycle configuration, handover of service among base stations and/or networks, and channel reporting schemes. For example, in accordance with various embodiments, with regard to transmitter and receiver schemes, the base station may select less power intensive receivers such as, for example, matched filter receivers instead of optimized receivers such as, for example, zero forcing receivers or minimum means squared error receivers. Additionally, during transmission, the base station may select single antenna schemes instead of multiple antenna schemes.

With regard to configuring an error control scheme, in accordance with various embodiments, the base station may opt to choose combining hybrid automatic report requests (HARQ) instead of incremental redundancy HARQ. Additionally, a maximum number of HARQ retransmissions may be configured based upon the battery power level. The base station may opt to use less power intensive automatic report requests (ARQ) operations and/or may choose not to do MAC fragmentation and reassembly.

With regard to a coding scheme configuration, in accordance with various embodiments, the base station may opt to use less power intensive coding schemes such as conventional coding instead of turbo coding.

With regard to overhead information with message packets configuration, in accordance with various embodiments, the base station may opt to not compress overhead information and/or may use telescopic maps instead of regular maps.

With regard to paging and handover configuration, in accordance with various embodiments, the base station may opt to use a bigger paging group in order to avoid frequent location update messages and/or may choose to use optimized hard handover instead of hard handover in order to minimize battery power consumption. Additionally, the paging cycle may be lengthened in order to reduce the number of times the mobile station checks to see if it has been paged, thereby increasing the amount of time spent in the idle mode.

With regard to feedback configuration, in accordance with various embodiments, the base station may choose less frequent, event-driven or differential channel reporting instead of reporting at each frame.

While the above examples have been provided to illustrate various types of operation parameter configurations that, at least in part, may consider battery level of a mobile station, those skilled in the art will understand that there are other uses for the battery level feedback and that there may be additional operation parameters that may be affected and changed in response to low battery levels.

As noted above, the thresholds for providing battery level feedback to the base station may change due to the network load, as this may affect the base station's choice of which operation parameters to alter, as well as how many operation parameters to alter.

In accordance with various embodiments of the present invention, the operator of a system may also provide input as to the frequency of battery level feedback and alteration of operation parameters. Such input may vary depending upon the load of the network.

Figure 5:
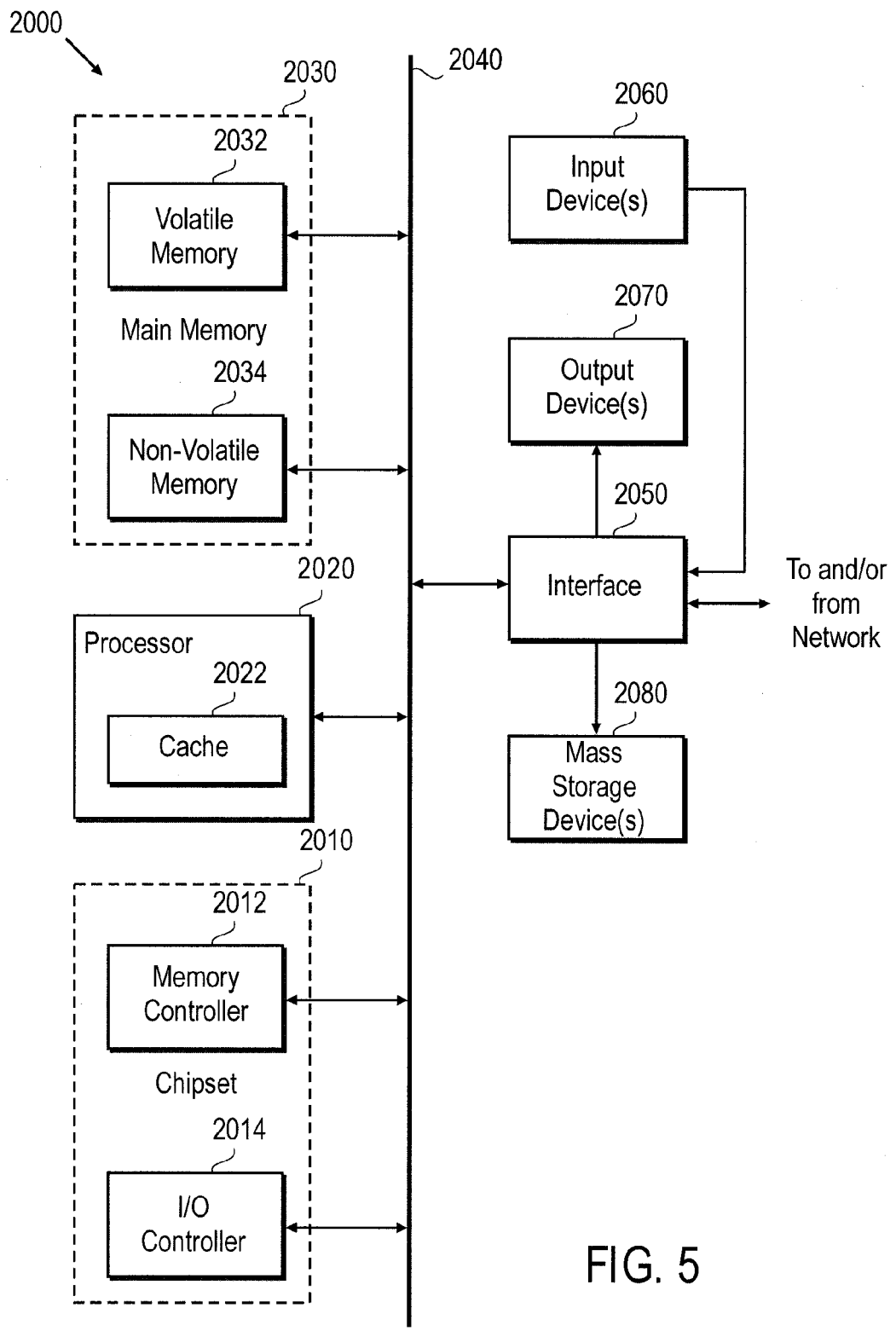
FIG. 5 is a block diagram representation of an example processor system that may be used to practice various aspects of the present invention.

FIG. 5 is a block diagram of an example processor system 2000 adapted to implement the methods and apparatus disclosed herein, in accordance with various embodiments. The processor system 2000 may be a desktop computer, a laptop computer, a handheld computer, a tablet computer, a PDA, a server, an Internet appliance, a mobile phone, a pager and/or any other type of computing device. The processor system 2000 may be used as a mobile station, access point or a base station.

The processor system 2000 illustrated in FIG. 5 may include a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The chipset 2010 may be implemented using one or more Wireless Personal Area Network (WPAN) components, Wireless Local Area Network (WLAN) components, Wireless Metropolitan Area Network (WMAN) components, Wireless Wide Area Network (WWAN) components, and/or other suitable networking components. In particular, in various embodiments designed to be a mobile station or a base station, the chipset 2010 may be endowed with the teachings of the present invention, implementing corresponding selected aspects of the above described battery level feedback and associated operations. The processor 2020 may be implemented using one or more processors, e.g. those of the Intel® Core™ technology, Intel® Pentium® technology, the Intel® Itanium® technology, the Intel® Centrino™ technology, the Intel® Core™ Duo technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device. In various embodiments designed to be used as a server, suitable for hosting the above described base station functions, main memory 2030 may include (a non-persistent copy of the) instructions implementing all or portions of the above described base station functions.

The processor system 2000 may also include an interface circuit 2050 that is coupled to the bus 2040. The interface circuit 2050 may be implemented using any type of interface standard such as an Ethernet interface, a universal serial bus (USB), a third generation input/output (3GIO) interface, and/or any other suitable type of interface. In various embodiments designed to be a mobile station, selected aspects of the above described operations may be implemented in interface circuit 2050, in addition to or in lieu of the endowment in chipset 2010.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives. In various embodiments designed to be used as a server, suitable for hosting the above described base station functions, mass storage device(s) may include (a non-persistent copy of the) instructions implementing all or portions of the above described base station functions.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 5 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. An apparatus comprising:
a control block configured to obtain a battery level for at least one battery of a device hosting the apparatus;
a transmit block operatively coupled to the control block and configured to transmit information relating to the battery level to a base station of a network comprising a plurality of base stations and with which the device is communicatively associated; and
a receive block operatively coupled to the control block and configured to receive, from the base station, one or more power threshold levels to provide the control block a basis for a battery-level feedback event, the one or more power threshold levels having been selected by the base station based at least in part on a load of the network, and to receive information relating to at least one operation parameter configuration for the device, the at least one operation parameter configuration being based at least in part on the transmitted information relating to the battery level, wherein the at least one operation parameter configuration comprises a selection of an antenna scheme that is a single antenna scheme instead of a multiple antenna scheme;
wherein the control block is configured to configure operation parameters of the device based at least in part on the at least one operation parameter configuration.

2. The apparatus of claim 1, wherein the control block is configured to control the transmit block to periodically transmit information relating to the battery level to the base station communicatively associated with the device.

3. The apparatus of claim 1, wherein the control block is configured to control the transmit block to transmit information relating to the battery level to the base station communicatively associated with the device based upon occurrence of the battery-level feedback event.

4. The apparatus of claim 3, wherein the battery-level feedback event is defined as the battery level passing below at least one power threshold level of the one or more power threshold levels.

5. The apparatus of claim 4, wherein the one or more power threshold levels comprises a plurality of power threshold levels.

6. The apparatus of claim 5, wherein the plurality of power threshold levels change based upon load of the network.

7. The apparatus of claim 1, wherein the receive block is further configured to receive a request, from the base station, for information relating to the battery level and the control block is configured to control the transmit block to transmit the information relating to the battery level in response to the request.

8. The apparatus of claim 1, wherein at least the transmit and receive blocks are part of a transceiver having at least one common component.

9. A method comprising:
selecting, by a base station within a network comprising a plurality of base stations, one or more power threshold levels based at least in part on a load of the network;
providing, by the base station, the one or more power threshold levels to a mobile station to provide the mobile station a basis for a battery-level feedback event;
receiving, by the base station, a battery level for at least one battery within the mobile station;
determining, by the base station, at least one operation parameter configuration for the mobile station based at least in part on the received battery level; and
transmitting, by the base station, the at least one operation parameter configuration to the mobile station;
wherein determining, by the base station, at least one operation parameter configuration for the mobile station based at least in part on the received battery level comprises selecting an antenna scheme that is a single antenna scheme instead of a multiple antenna scheme.

10. The method of claim 9, wherein receiving a battery level comprises receiving the battery level periodically.

11. The method of claim 9, wherein receiving a battery level comprises receiving the battery level based upon occurrence of the battery-level feedback event on the mobile station.

12. The method of claim 11, wherein receiving a battery level comprises receiving the battery level based upon occurrence of the battery-level feedback event on the mobile station comprises receiving the battery level when the battery level passes at least one power threshold level of the one or more power threshold levels.

13. The method of claim 12, wherein the one or more power threshold levels comprises multiple power threshold levels.

14. The method of claim 13, further comprising:
providing, by the base station, one or more updates to the one or more power threshold levels based upon load of the network.

15. The method of claim 9, further comprising requesting, by the base station, a battery level from the mobile station and receiving a battery level comprises receiving the battery level in response to the request.

16. The method of claim 9, further comprising:
determining, by the base station, another operation parameter configuration for the mobile station based at least in part on the received battery level, wherein the another operation parameter configuration comprises a selection of a receiver scheme that is a matched filter receiver, a zero forcing receiver, or a minimum means squared receiver.

17. The method of claim 9, further comprising:
determining, by the base station, another operation parameter configuration for the mobile station based at least in part on the received battery level, wherein the another operation parameter configuration comprises a selection of a hybrid automatic report requests (HARQ) scheme with a maximum number of HARQ retransmissions.

18. The method of claim 9, further comprising:
determining, by the base station, another operation parameter configuration for the mobile station based at least in part on the received battery level, wherein the another operation parameter configuration-comprises a selection of a channel reporting scheme that is event-driven channel reporting scheme or a differential channel reporting scheme.

19. A system comprising:
an omnidirectional antenna;
a control block configured to obtain a battery level for at least one battery of a device;
a transmit block operatively coupled to the omnidirectional antenna and the control block, the transmit block being configured to transmit information relating to the battery level to a base station of a network comprising a plurality of base stations and with which the device is communicatively associated; and
a receive block operatively coupled to the omnidirectional antenna and the control block, the receive block being configured to receive, from the base station, one or more power threshold levels to provide the control block a basis for a battery-level feedback event, the one or more power threshold levels having been selected by the base station based at least in part on a load of the network, and to receive information relating to at least one operation parameter configuration for the device based at least in part on the battery level;
wherein the at least one operation parameter configuration comprises a selection of an antenna scheme that is a single antenna scheme instead of a multiple antenna scheme;
wherein the control block is configured to configure operation parameters of the device based at least in part on the at least one operation parameter configuration.

20. The system of claim 19, wherein at least the transmit and receive blocks are part of a transceiver having at least one common component.

21. The system of claim 19, wherein the control block is configured to control the transmit block to periodically transmit information relating to the battery level to the base station.

22. The system of claim 19, wherein the control block is configured to control the transmit block to transmit information relating to the battery level based upon occurrence of the battery-level feedback event.

23. The system of claim 19, wherein the receive block is further configured to receive a request, from the base station, for information relating to the battery level and the control block is configured to control the transmit block to transmit the information relating to the battery level in response to the request.

* * * * *